(12) United States Patent
Sonnaillon

(10) Patent No.: US 9,812,951 B2
(45) Date of Patent: Nov. 7, 2017

(54) ADVANCED PFC VOLTAGE CONTROLLER

(71) Applicant: Pacific Power Source, Inc., Irvine, CA (US)

(72) Inventor: Maximiliano O. Sonnaillon, Sante Fe (AR)

(73) Assignee: Pacific Power Source, Inc., Irvine, CA (US)

( * ) Notice: Subject to any disclaimer, the term of this patent is extended or adjusted under 35 U.S.C. 154(b) by 9 days.

(21) Appl. No.: 14/999,532

(22) Filed: May 19, 2016

(65) Prior Publication Data

US 2016/0352216 A1    Dec. 1, 2016

Related U.S. Application Data

(60) Provisional application No. 62/179,910, filed on May 21, 2015, provisional application No. 62/179,906, filed on May 21, 2015.

(51) Int. Cl.
   *H02M 1/42*      (2007.01)
   *H02M 1/00*      (2006.01)

(52) U.S. Cl.
   CPC .. *H02M 1/4208* (2013.01); *H02M 2001/0019* (2013.01); *H02M 2001/0025* (2013.01); *Y02B 70/126* (2013.01)

(58) Field of Classification Search
   CPC ....... H02M 1/4208; H02M 2001/0019; H02M 2001/0025
   See application file for complete search history.

(56) References Cited

U.S. PATENT DOCUMENTS

| | | | |
|---|---|---|---|
| 8,279,642 B2 | 10/2012 | Chapman et al. | |
| 8,325,499 B2 | 12/2012 | Krein et al. | |
| 2009/0237963 A1* | 9/2009 | Prasad | H02M 1/4208 363/40 |
| 2013/0322122 A1* | 12/2013 | Sigamani | H02M 1/4225 363/13 |
| 2015/0146458 A1* | 5/2015 | Lim | H02M 3/158 363/44 |
| 2015/0263603 A1* | 9/2015 | Pahlevaninezhad | H02M 1/4208 363/17 |

OTHER PUBLICATIONS

Roland Gruel, et al, Analysis and Control of a Three-Phase, Unity Power Factor Y-Rectifier, IEEE Transactions on Power Electronics, vol. 22, No. 5, Sep. 2007, USA.

Laszlo Huber, et al, Analysis, Design, and Evaluation of Three-Phase Three-Wire Isolated AC-DC Converter Implemented with Three Single-Phase Converter Modules, IEEE, 2016, USA.

(Continued)

*Primary Examiner* — Adolf Berhane
*Assistant Examiner* — Bart Iliya
(74) *Attorney, Agent, or Firm* — Gibbs & White P.C.; Franklin E. Gibbs

(57) ABSTRACT

A power factor correction voltage controller is disclosed. In one embodiment, the controller has a linear PI compensator, a moving average filter, a non-linear error circuit, a hysteretic peak control, and an output power feedforward. The power factor correction voltage controller provides regulation of maximum and minimum voltage values but without allowing large periodic fluctuations in the input power/current.

4 Claims, 9 Drawing Sheets

(56) References Cited

OTHER PUBLICATIONS

Min Chen, et al, Feedforward Current Control of Boost Single-Phase PFC Converters, IEEE Transactions on Power Electronics, vol. 21, No. 2, Mar. 2006, USA.
Juan Galvez, Swinging Bus Operation of Inverters for Fuel Cell Applications With Small DC-Link Capacitance, IEEE Trans on Power Electronics, vol. 30, No. 2, Feb. 2015, USA.
Peter Ksiazek, et al, Swinging Bus Technique for Ripple Current Elimination in Fuel Cell Power Conversion,IEEE Trans on Power Electronics, vol. 29, No. 1, Jan. 2014 USA.
Texas Instruments, UCC2805x, UCC3805x Transition Mode PFC Controller, datasheet, Sep. 2015 USA.
Texas Instruments, Extended Frequency Range (10 kHz to 300 kHz), Interleaving Continuous Conduction Mode PFC Controller, datasheet, Mar. 2012 USA.
Philip Todd, UC3854 Controlled Power Factor Correction Circuit Design, Unitrode application note, 1999 USA.

\* cited by examiner

ADVANCED PFC VOLTAGE CONTROLLER

RELATED APPLICATIONS

This application claims priority under 35 U.S.C. §119 to U.S. Provisional Application No. 62/179,910 filed on May 21, 2015, and U.S. Provisional Application No. 62/179,906 filed on May 21, 2015, the contents of both of which are incorporate herein by reference in their entirety.

FIELD OF THE INVENTION

This invention generally relates to voltage controllers and in particular to voltage controllers that will regulate at its setpoint value, even during transients and perturbations.

BACKGROUND OF THE INVENTION

In single phase AC power supplies, the output power is modulated at twice the output frequency. For the typical case of a sinewave, the output power varies from zero to twice the average power:

$$P(t) = P_{AVG} + P_{AVG} \cdot \sin(2\pi ft) \quad (1)$$

From this equation, a sinusoidal voltage/current output causes the output power to swing from 0 to twice the average output power with a frequency of twice the voltage waveform.

Because of the energy conservation principle, the input power must be equal to the output power plus any energy accumulated in the converter. Modern converters typically use capacitors to temporally store energy. Because of size and cost constrains this energy storage is limited, making it more effective at high frequency than low frequency (longer cycles).

Due to the required energy storage, the generation of low frequency power signals is one of the main factors that determines required internal capacitance. Another key factor is the bus voltage regulation, because it affects how well the available capacitance is used.

When the DC bus capacitance is not big enough or the control loop does not provide proper regulation, the bus voltage can deviate from its ideal DC set-point. Allowing the DC bus in the capacitor bank to swing over a wide band has two significant disadvantages:

1) The difference between the maximum and minimum DC bus voltage represents available energy storage that cannot be really accounted for. This means that the utilization of the capacitors is reduced, thus increasing cost and volume.

2) The power stages that are fed from the DC bus (typically DC to DC converters or inverters) are designed to operate at both the maximum DC bus and the minimum. If this range is too high, it can significantly affect cost, size and energy efficiency. For example, higher voltage FETs have higher conduction losses than lower voltage ones for a given die size, and also a higher DC bus increases switching losses.

Large fluctuations in the output power, such as the ones caused by low frequency AC, cannot be totally filtered by a reasonable amount of capacitance. The only way to avoid large variations in the DC bus is to allow the input power to have similar fluctuations. If the input power is pulsed, or modulated in amplitude, the input power factor is severely affected thus increasing power losses in the input circuits and AC electrical installation. For the extreme case of full modulation of the input power (i.e. no internal energy storage) due to a low frequency sinusoidal output, the theoretical power factor is the following:

$$PF = \frac{P_{AVG}}{\sqrt{P_{AVG}^2 + P_{AC}^2}} = \frac{P_{AVG}}{P_{AVG}\sqrt{1+0.5}} = 0.8165 \quad (2)$$

Where $P_{AC}$ was assumed to be $P_{AVG}/\sqrt{2}$ because it was a fully pulsed power signal as in equation (1). This ideal case would be possible with a front end controller that is able to generate the exactly required input power/current based on the output power. This reduction in power factor is too big for practical applications, which typically require power factors higher than 0.9.

SUMMARY OF THE INVENTION

One embodiment of a power factor correction voltage controller includes a digital controller comprising a voltage setpoint, a linear PI compensator, a non-linear gain, a peak hysteretic control, a current loop, and an output power feedforward. There are also power stages for providing voltage out feedback, voltage in feedback, inductor current feedback, and current out feedback.

The linear PI compensator regulates voltage based upon a moving average filter (MAF) that receives the voltage out feedback from the power stages with the MAF being tuned in real time. The non-linear gain is used for determining a non-linear error factor when the voltage out feedback deviates from a setpoint by more than a pre-programmed limit and the error factor is then utilized by the PI compensator to further regulate voltage.

The peak hysteretic control detects the voltage out feedback of the DC bus and directs the power factor correction voltage controller output to zero if the DC bus voltage exceeds a maximum value, when the voltage deviation exceeds a pre-programmed limit, and the hysteretic peak control directs the power factor correction voltage controller output to a maximum when the DC bus voltage reaches a minimum value, when the voltage deviation exceeds a pre-programmed limit.

The output power feedforward (FF) utilizing a MAF tuned in real time based on the output frequency of the AC source, and the applied FF term is the sum of a percentage of the output power FF term with the MAF plus a percentage of the FF term without the MAF, and the sum of both percentages equals 100%, and the ratio of the MAF versus the non-MAF components is defined by a coefficient that allows optimization of the power factor correction voltage controller.

The output of the voltage feedback MAF, the voltage setpoint, and the non-linear action, comprise the input to the linear PI compensator, and the output of the linear PI compensator and the output of the FF comprising the input to the peak hysteretic control. The voltage out feedback is input to the peak hysteretic control and is utilized by the peak hysteretic control to prevent the digital controller from exceeding maximum limits. The output from the peak hysteretic control comprising the input to a current loop, and an inductor current feedback from the power stages is utilized by the current loop, and the current loop comprising the input to the power stages. This then forms a closed loop.

BRIEF DESCRIPTION OF THE DRAWINGS

The invention is generally shown by way of reference to the accompanying drawings in which.

DETAILED DESCRIPTION OF THE INVENTION

The present invention deals with the challenge of minimizing the DC bus voltage excursion and at the same time keeping the power factor at the expected levels (e.g. >0.9). This is achieved by means of a voltage controller that, during normal operation, provides accurate regulation within maximum and minimum voltage values but without allowing large periodic fluctuations in the input power/current.

Figure 1:
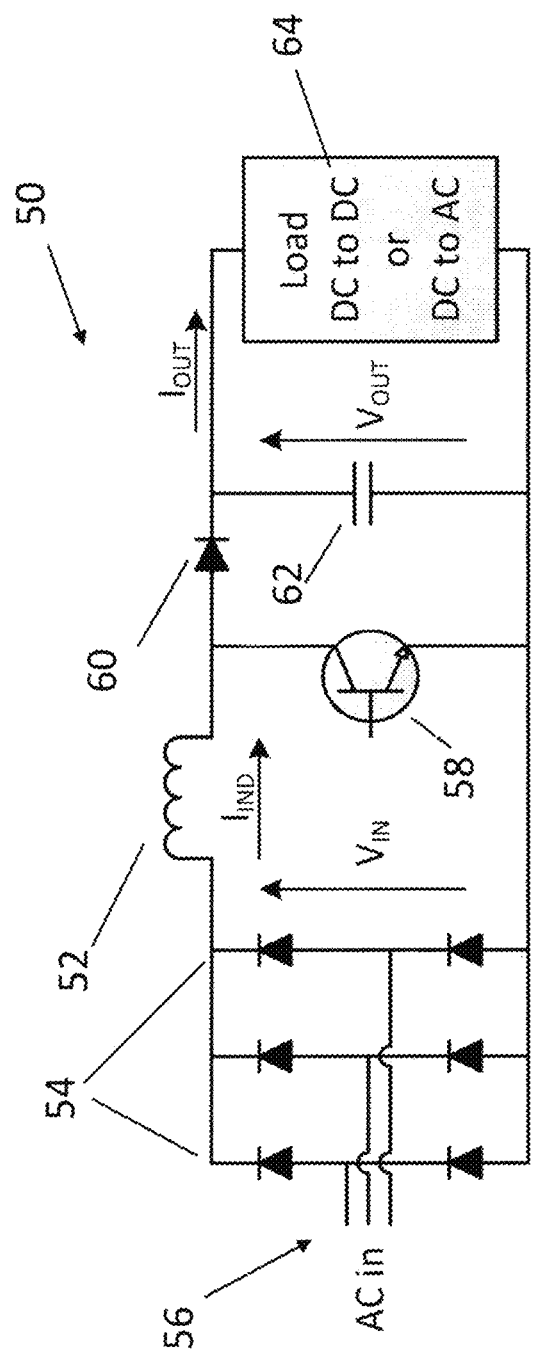
FIG. 1 is a schematic diagram of a prior art three-phase power factor correction state with single inductor, where an embodiment of the present invention can be applied.
Figure 2:
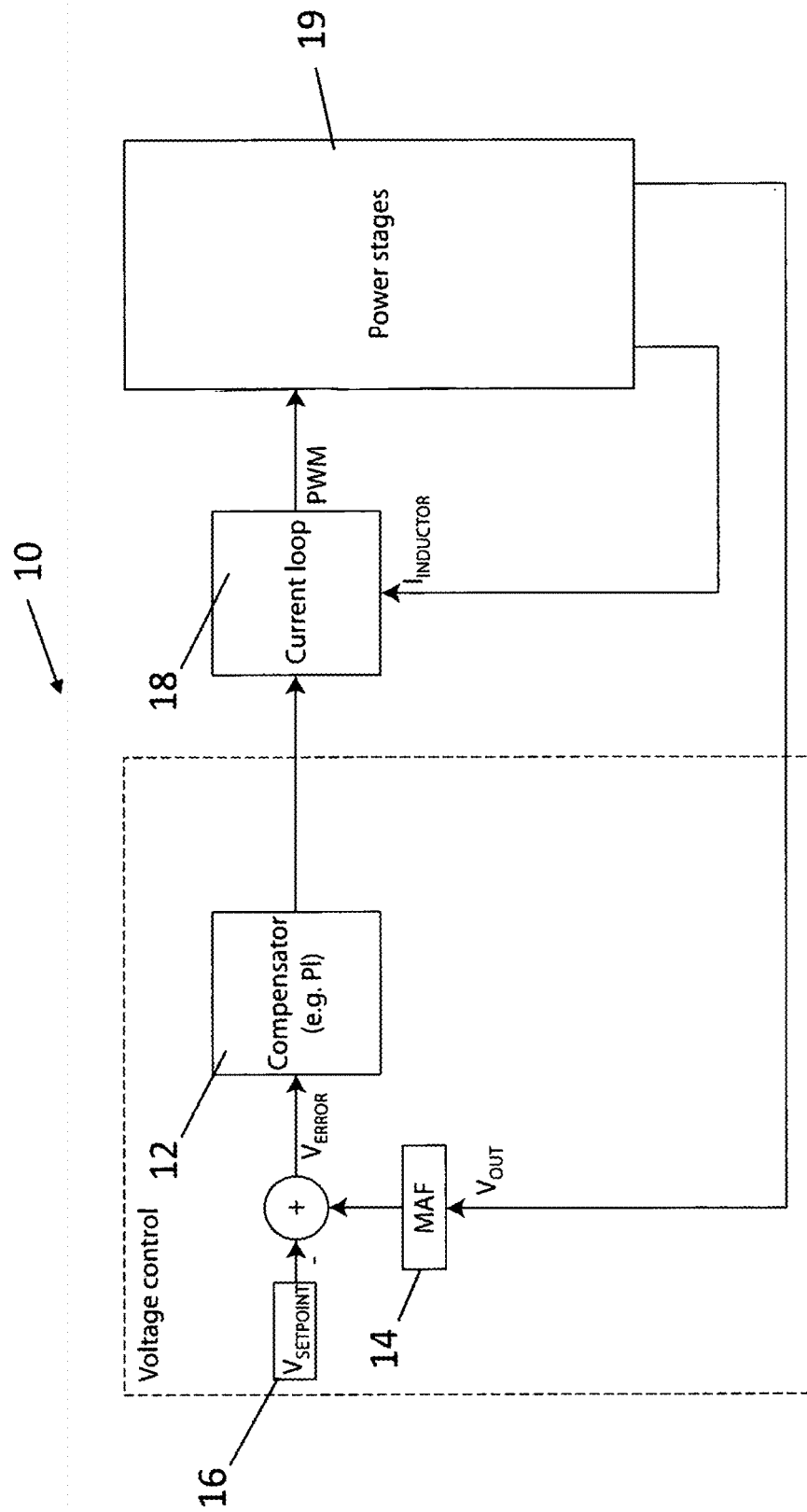
FIG. 2 is a block diagram of a prior art Swinging Bus Technique to eliminate low frequency modulation from the current.

FIG. 1 identifies a three-phase single inductor PFC (50) as a structure where an embodiment of the invention could be applied. In FIG. 2 the single inductor (52) is connected to the diode bridge (54) that are connected to the AC in (56). A transistor (58), diode (60), capacitor (62), and load (64) are identified. The same concept can be applied to a single phase PFC, a 3-phase active bridge PFC, or similar topologies.

The inductor (52), transistor (58), diode (60) and capacitor (62) form a conventional boost converter that transforms the input voltage $V_{IN}$ to a higher output voltage $V_{OUT}$, by means of a voltage controller that regulates $V_{OUT}$. The output voltage is usually referred to as DC bus, and is used to feed other converters (64), such as DC to DC or DC to AC. The boost converter voltage controller makes use of a current controller to shape the waveform of the input inductor based on the inductor current feedback ($I_{IND}$). Controlling the input current waveform allows to enhance the input power factor at the AC input.

The use of fully digital control allows the implementation of advanced control strategies to optimize the transient response and steady state performance. Digital controllers can take advantage of all the electric variables available in the system (i.e. $I_{IND}$, $I_{OUT}$, $V_{IN}$, $V_{OUT}$) by implementing sophisticated algorithms with this information. The voltage controller in this invention is based on a novel combination of a voltage loop with traditional linear PI compensation, a non-linear action, a hysteretic control, and a novel output power feedforward scheme. The system composed of these 4 pieces allows the controller to keep the DC bus under very tight regulation, and to maximize the power factor at the same time. The description of the 4 parts is the following:

1) Linear Compensator:

A conventional voltage loop with PI compensation regulates the voltage at steady state based on a feedback. Low PI gains are used to avoid significant modulation of the input current, which is a common design practice in the field as identified in Texas Instruments—UCC28070A datasheet (2012)—slusaw0, and P. C. Todd, "UC3854 Controlled Power Factor Correction Circuit Design", Unit-rode Application Note, 1998.

A moving average filter (MAF) with a length equal to and integer number of periods of the AC output (assuming an AC supply is fed by the PFC) is used to eliminate the output frequency component from the feedback. FIG. 2 is a diagram of a prior art controller (10) having a PI compensator (12), a MAF (14), setpoint (16), current loop (18) and power stages (19). The MAF (14) makes the PI loop blind to output-frequency related ripple, with the goal of completely eliminating the modulation of the input current/power as identified in the article, "Swinging Bus Technique for Ripple Current Elimination in Fuel Cell Power Conversion", by Peter F. Ksiazek and Martin Ordonez, IEEE Transactions on Power Electronics Vol. 29, No. 1, January 2014 ("Ksiazek"). Since the voltage loop does not see the fundamental ripple, it is not able to correct it and thus the DC bus ripple is significantly increased, often referred to as a swinging bus. The goal of this technique is to eliminate the modulation of the input current caused by the low frequency ripple.

In, Ksiazek, this technique is proposed and applied to control Fuel-Cell (FC) converters. In this application the low-frequency modulation of the input current is intended to be eliminated because it has a detrimental effect in the FC power extraction efficiency, mainly because the AC component dramatically increases RMS current without transferring useful power to the output.

As indicated before, a high voltage ripple in the DC bus has negative impact in the rest of the converter. The present invention employs techniques to reduce it to an optimum level, composed by the next 3 components. In the present invention the voltage feedback MAF length is optimized in real time based on the output frequency, making it an integer multiple of the output period to maximize the filter performance. For ultra-low frequency or DC output, the MAF length is limited to a predefined value. This real time optimization is particularly necessary in programmable power converters where the output frequency can be changed during operation.

Figure 3:
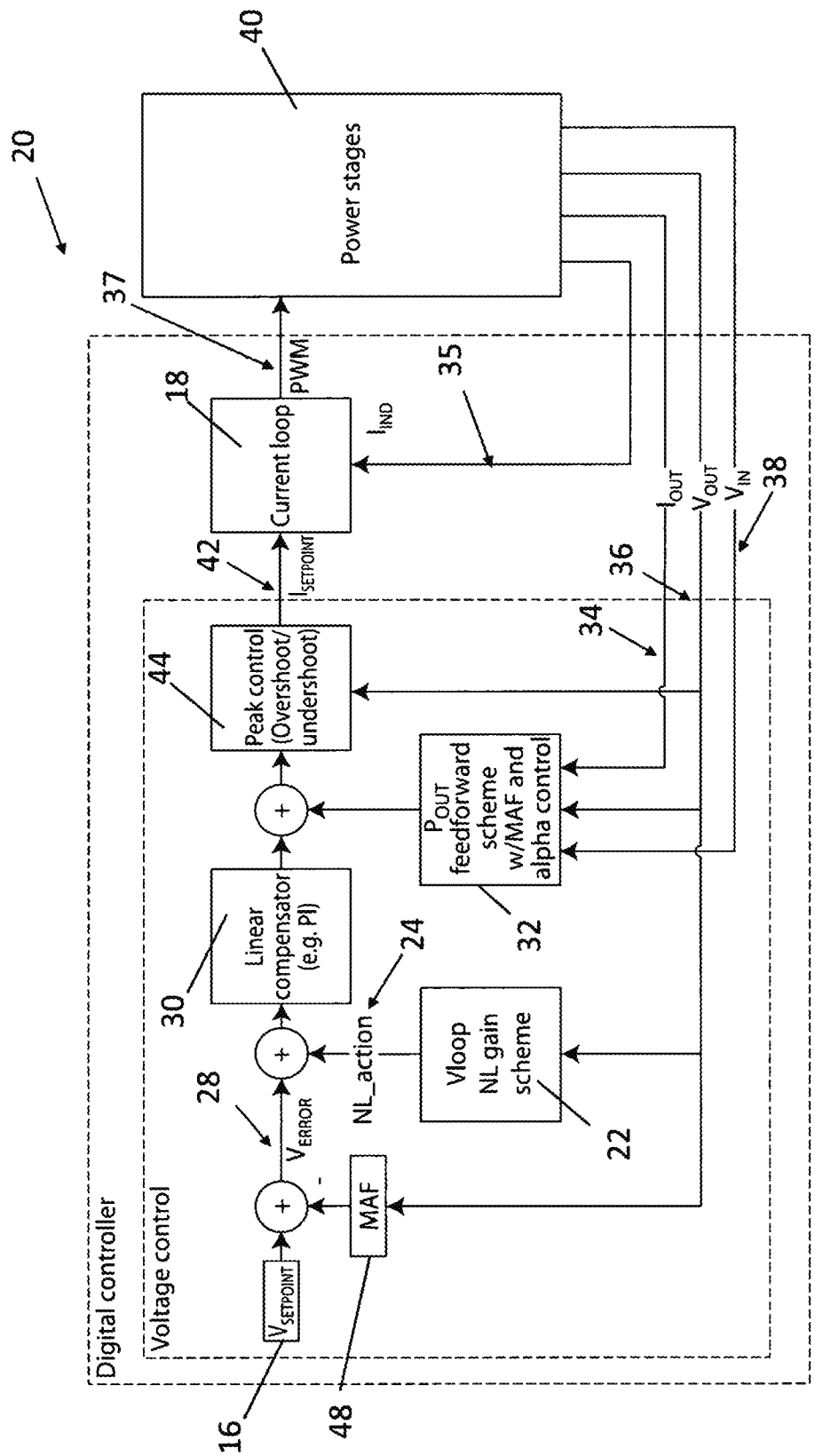
FIG. 3 is a block diagram of an embodiment of the advanced PFC voltage controller of the present invention.

2) Non-Linear Gain:

FIG. 3 is an embodiment of the advanced PFC voltage controller (20) and identifies the Vloop NL Gain scheme (22). When the error exceeds a certain band, there is a boost term referred as NL_action (24) that is added to the voltage error (28) and then used by the linear compensator (30). The further the voltage deviates from the setpoint (16), the higher the term added to the error, and that is why it is referred as non-linear gain.

The purpose of this action is to accelerate the settling time after a large perturbation, at the expense of an increment in the modulation of the input current caused by the higher effective loop gain. This term allows the controller to quickly enter the small error band where only the low gain PI compensator is in control. After a transient (input or output perturbation) the error increases and the non-linear action provides speed to minimize the time it takes to reach the small error band.

Simple techniques have been used in prior art with analog electronics to achieve fast reaction to perturbations. They can be referred to gain-scheduling (Texas Instruments—UCC2805x datasheet (2002)—slus515g) or slew-rate correction (Texas Instruments—UCC28070A datasheet (2012)—slusaw0) and consist on using a higher gain when the error exceeds certain levels. The non-linear method in this invention provides a smooth change in the error and not a sudden step in the gain, and that improves performance during the transition.

Figure 4:
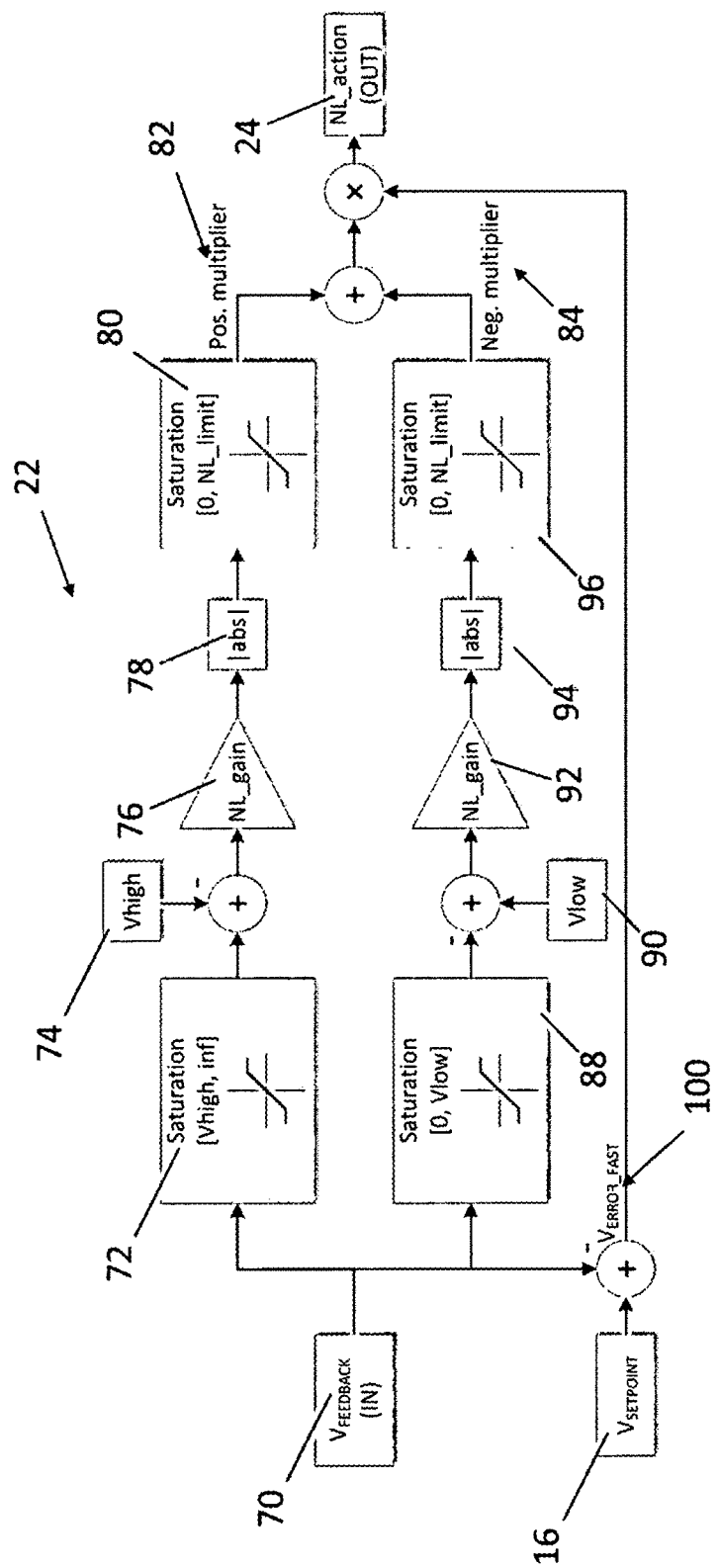
FIG. 4 is block diagram of an implementation of the non-linear action in the voltage loop.

FIG. 4 shows one embodiment of this part of the controller (22). There is a voltage feedback (70) to a first path with the saturation (72) that provides an output and along with the Vhigh constant (74), where Vhigh (74) is the high limit of the band of the setpoint (16), forms the input to the NL_gain (76) to the absolute function(78) and then the saturation (80) which in turn provides the Pos. multiplier (82) signal that is added to the Neg. multiplier signal (84) and provides the NL_action (24). A second path has the voltage feedback (70) to the saturation (88) that provides an output and along with the Vlow constant (90), where Vlow(90) is the low limit of the band of the setpoint (16), forms the input to the NL_gain (92) to the absolute function (94) and then the saturation (96) for the Neg. multiplier (84) and to the NL_action (out) (86). The setpoint (16) is utilized with the voltage feedback (70) to form the error_fast signal (100) that is utilized as a multiplier for the combined Pos. multiplier (82) and Neg. multiplier (84) before arriving at the NL_action (24).

The DC voltage (70), without MAF, is compared against the maximum Vhigh, and minimum Vlow, limits (74, 90), and when these limits are exceeded then a multiplier is calculated based on a constant NL_gain and the voltage difference that exceeds the limit. There are two multipliers calculated, one for the case the voltage exceeds the maximum limit (74) and the other when the voltage is below the minimum limit (90), called Pos. multiplier (82) and Neg. multiplier (84). Both multipliers have positive values due to the absolute functions (78) (94), and only one at the time can be non-zero. The resultant unique multiplier is the sum of both terms, and is applied to the fast error (100) (calculated without any MAF) to generate the extra error term called NL_action (86), which boosts the speed of the linear compensator.

Figure 5:
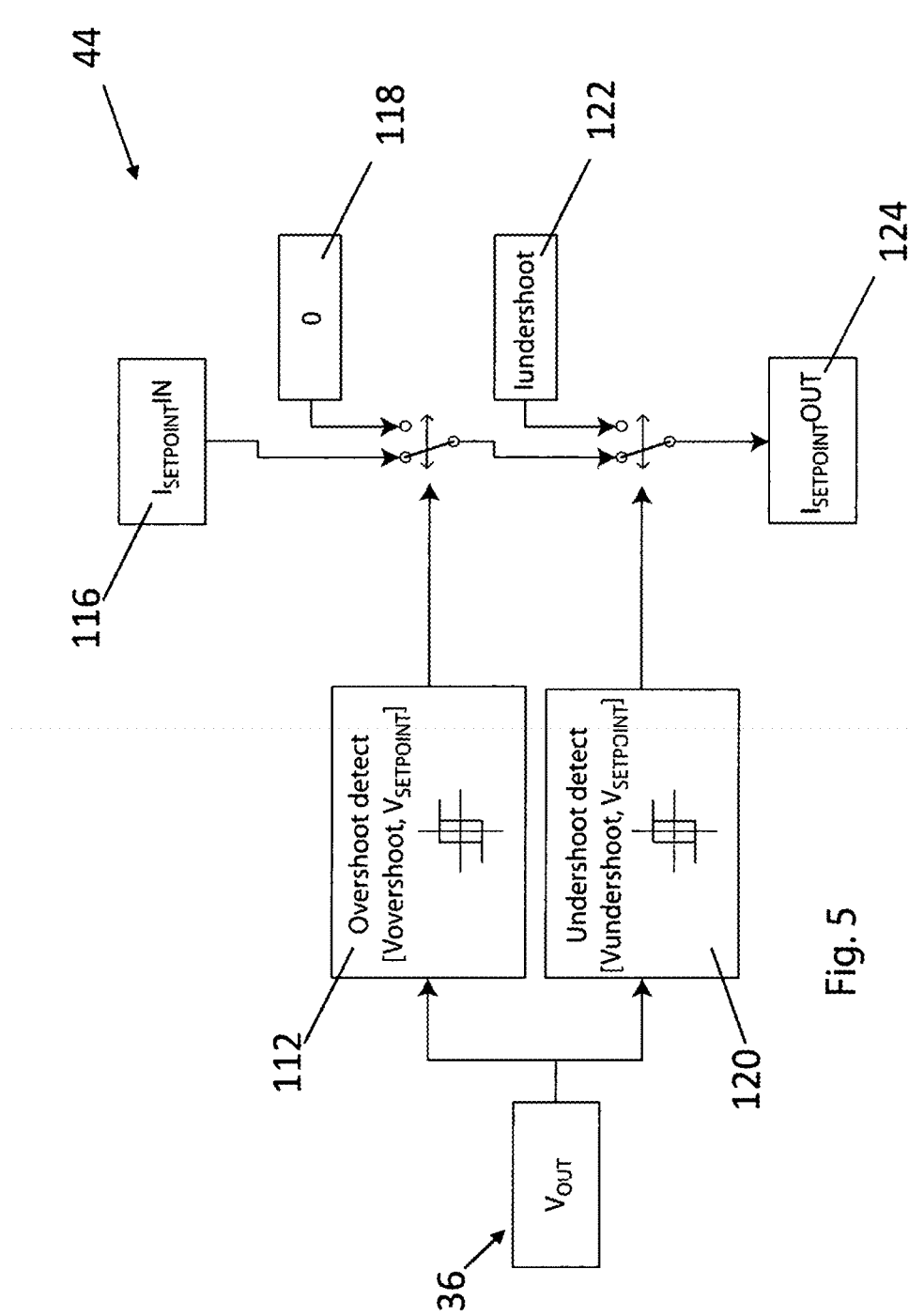
FIG. 5 is a block diagram of the peak hysteretic control of the voltage loop implementation.

3) Peak Control:

A peak hysteretic control makes the output command take its maximum or minimum values under extreme cases, such as sudden transients. This means that the input current is made zero if the DC voltage exceeds a maximum value (to prevent over-voltage faults) and is made maximum when the DC voltage reaches a minimum value (to prevent under-voltage faults). This action creates large fluctuations in the input current/power so it is not intended to operate at steady state, but only to allow the system to provide regulation during and after large perturbations. FIG. 5 is a diagram of the peak hysteretic control (44). It operates by comparing the voltage feedback against a maximum value (Vovershoot) and a minimum value (Vundershoot). If any of these values are exceeded, the Isetpoint input (116) is made equal zero or equal Iundershoot, respectively. Iundershoot is the maximum rated PFC input current. The comparators (112, 120) use hysteresis, being the disable value equal to the $V_{SETPOINT}$, the intended regulation value for the voltage controller. The overshoot detect (112) receives the Vout (36) measurement and provides an input to determine switching in regards to the Isetpoint IN (116) and "0" (118). The undershoot detect (120) receives the Vout (114) and provides an input to determine switching in regards to the result of the Overshoot detect switching and the Iundershoot (122). The result is the Isetpoint OUT (124).

Peak and hysteretic controls are well known techniques, but conventionally employed to control inductor current in different types of converters and also output voltage in DC to DC converters. Using this technique in front end applications can significantly affect input power factor and distortion, and that is why it is not commonly adopted. The performance improvements provided by the other 3 components of the system make the hysteretic control be activated only in extreme conditions (such as a brown-out recovery) and not in steady state. Hence, its benefits can be used without significant negative effects.

The significance of the peak control is that the voltage will not exceed the maximum limits, even after severe perturbations, thus allowing the design to be based on a much less conservative voltage range.

To summarize the discussed system components, the controller employs 3 error bands:
 a) Small error (e.g. ≤+/−2%): only the linear PI compensator is active.
 b) Medium error (e.g. ≤+/−5%): non-linear term is added to the error used by the PI compensator.
 c) Large error (e.g. >+/−5%): peak control, the controller reacts as quickly as possible by applying the maximum possible commands (current setpoint).

4) Output Power Feedforward with Programmable AC Gain:

Feedforward schemes have been proposed in prior art to improve PFC performance, both for controlling the input current and the bus voltage as well. When applied to input current control, feedforward helps to mitigate perturbations introduced by fast changes in the input voltage. An example can be found in the article, "Feedforward Current Control of Boost Single-Phase PFC Converters", Min Chen and Jian Sun, IEEE Transactions on Power Electronics, Vol. 21, No. 2, March 2006. Applied to DC bus voltage control, feedforward has been used in prior art to minimize the impact of sudden changes in the load as in the article, "Analysis and Control of a Three-Phase, Unity Power Factor Y-Rectifier", Roland Gruel, Simon D. Round, and Johann W. Kolar, IEEE Transactions on Power Electronics, Vol. 22, No. 5, September 2007.

Figure 6A:
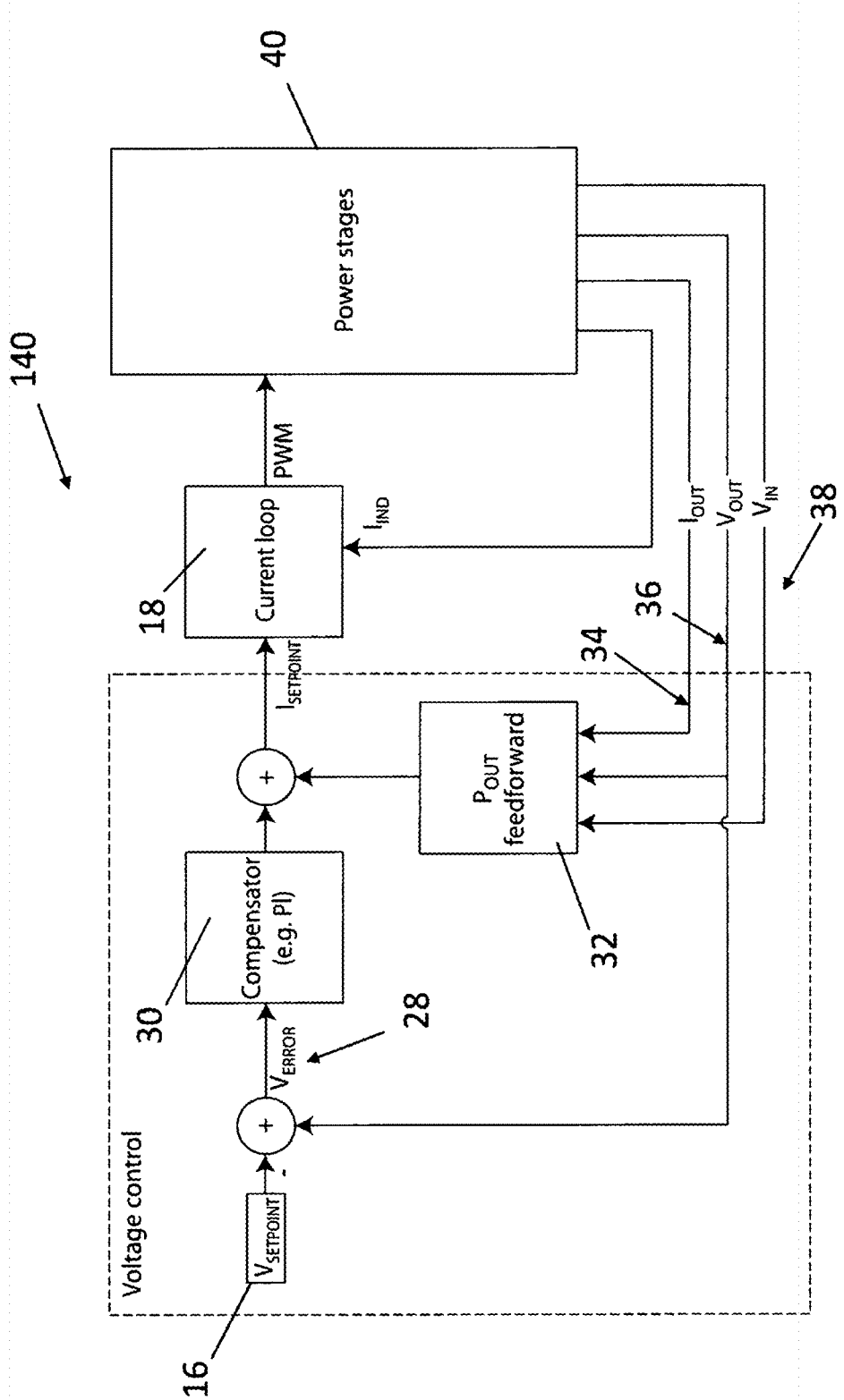
FIG. 6a is a block diagram of a prior art a voltage controller that uses output power feedforward.

Since the voltage loop has a limited response speed, which is used to avoid distortion in the input current, its phase lag makes it not effective and efficient to cancel the fundamental ripple. The voltage loop transfer function causes a phase shift in the AC components and the resultant current does not effectively compensate the voltage ripple. This produces unnecessary modulation in the input current without any real benefit for voltage regulation. Output power feedforward can provide an effective way of attenuating the fundamental voltage ripple because, if it has enough bandwidth, it does not necessarily have phase lag as the voltage loop. FIG. 6a identifies a voltage control (140) that incorporates the output power feedforward (32) as part of the voltage control (140). The setpoint (16) is added to the Vout feedback (36) of the power stages (40) to arrive at the Verror (28) that is the input to the compensator (30). The feedforward (32) receives the Iout feedback (34), Vout feedback (36), and Vin feedback (38). The output from the feedforward (32) is added to the output from the compensator (30) and results in the Isetpoint (42). The Isetpoint (42) and Iinductor (35) are the inputs for the current loop (18) that in turn send the pulse width modulation (PWM) (37) signal to the power stages (40).

Figure 6B:
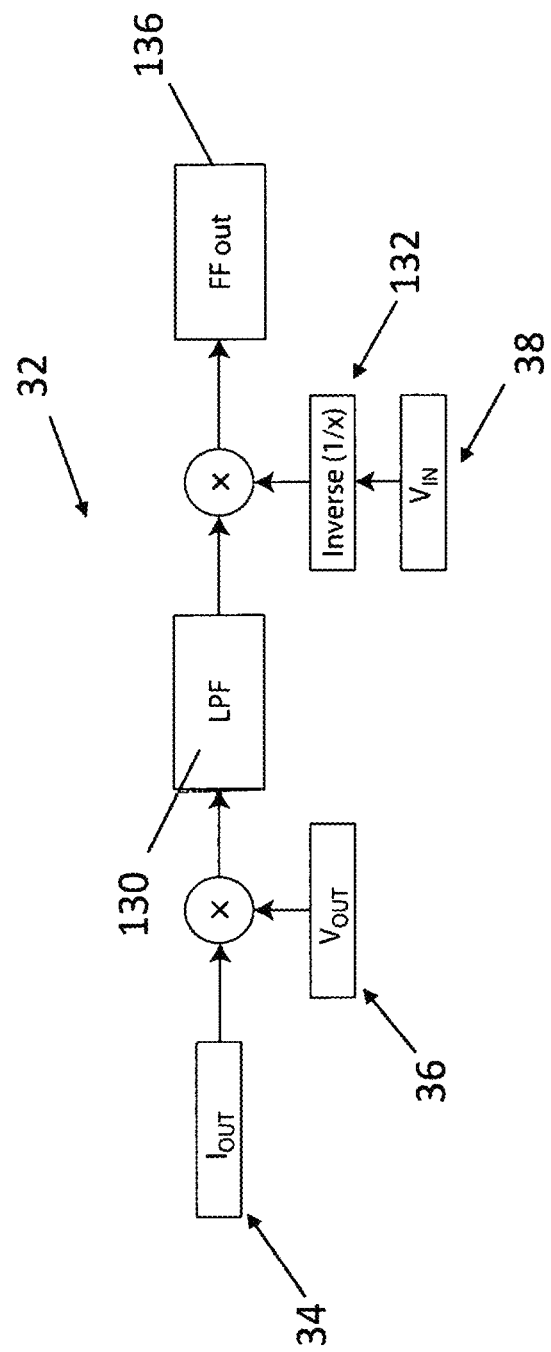
FIG. 6b is a block diagram of a prior art implementation of output power feedforward implementation with a low pass filter.

Turning to FIG. 6b, the output power feedforward (32) consists on using the power measured at the output of the PFC bus to anticipate the required input power to the front end. $I_{OUT}$ (34) and $V_{OUT}$ (36) are used to provide a multiplier that forms the input to the low pass filter (LPF) (130), the output of which is utilized do determine a multiplier along with the inverse (132) of the $V_{IN}$ (38). Arriving at the FF output (136). The result of these operations represents the required input current for the PFC to provide the required power:

$$I_{IN} = V_{OUT} \times I_{OUT}/V_{IN} \quad (3)$$

This technique significantly improves the transient response to sudden output power changes and minimizes DC bus voltage ripple with low frequency AC output, assuming a wide enough bandwidth provided by the low pass filter (130). The drawback of this technique in single-phase output sources is that all output power fluctuations are directly mirrored in the input current. This can significantly reduce the input power factor as discussed before and indicated in equation (2). The way to reduce the fluctuations is by reducing the bandwidth of the low pass filter, with a low enough cut-off frequency to filter out the bus ripple. Such a low frequency would produce delay and phase lag to the feedforward term, substantially reducing its benefits and therefore not considered as a convenient alternative.

It can be said that the output power feedforward technique with wide bandwidth has the opposite effect of the MAF filter used in the loop feedback (48). The MAF makes the loop blind to fluctuations caused by the fundamental AC and, on the other hand, output power feedforward makes it very sensitive to them.

Figure 7:
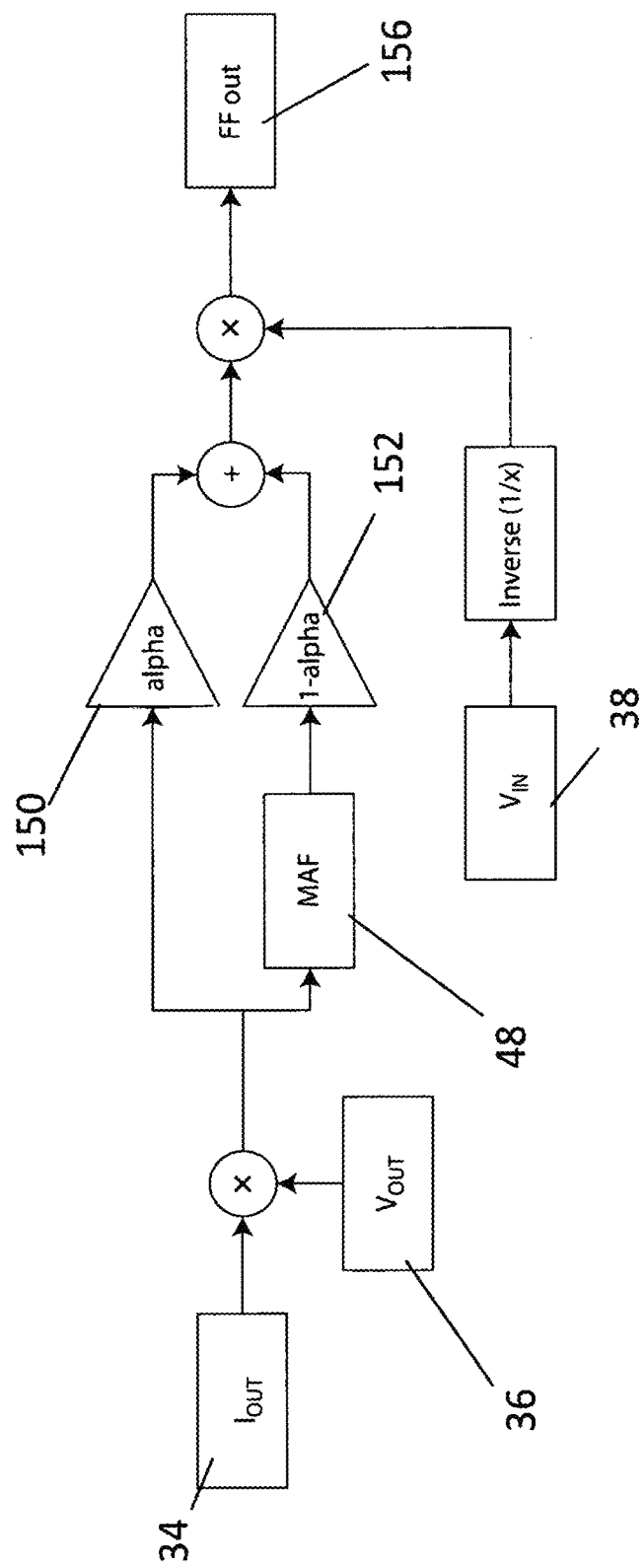
FIG. 7 is a block diagram of the output power feedforward implementation.

Embodiments of the present invention address this drawback, giving the possibility of optimizing how much of the output AC component is actually fed-forward, but without significantly affecting its performance. This is done by means of a MAF and additional real-time calculations of the feedforward term, as illustrated in FIG. 7. The output measurements $I_{OUT}$ (34) and $V_{OUT}$ (36) are utilized to form a multiplier that provides input for two paths. The first path has a gain equal to alpha (150) and the second path is to the MAF (48) that provides input to the (1-alpha) gain (152). The output of the direct (150) and filtered (152) paths are added to form an input for a multiplier. The Vin (38) provides an input for the Inverse (1/x) (154) that provides the other input for the multiplier. The result is the FF output (156), which represents the necessary input current to provide the output power.

The amount of AC component allowed to be present in the feedforward term is controlled by the parameter "alpha" that can take values from 0 to 1, "alpha" is identified in FIG. 7.

If alpha is 0, then 100% of the FF term is coming from the MAF, which completely eliminates the fundamental component (and its harmonics), thus significantly increasing the voltage fluctuations.

If alpha is 1, then it is reduced to the conventional FF technique that mirrors 100% of the output power fluctuations to the input, thus severely affecting input power factor.

Intermediate alpha values between 0 and 1 allow to regulate how much AC component the FF term has, thus allowing to optimize the trade-off between DC bus voltage fluctuations and power factor reduction. Bigger alpha means that more AC component is present in the FF term, reducing voltage ripple but also reducing power factor.

As was stated above, there are two parallel paths in the feedforward term, one direct and the other goes through the MAF. The alpha coefficient determines what proportion of each is used in the resulting feedforward term. A condition to maximize performance is that both gains are complementary, this means that their sum is one. This provides that all frequency components not filtered by the MAF have unity gain, especially the low frequency components (and DC) that provide the average-power information.

Being able to control and optimize the trade-off "voltage ripple vs. power factor" with just the value of one constant, referred as alpha in this document, is a substantial benefit of this invention.

Figure 8:
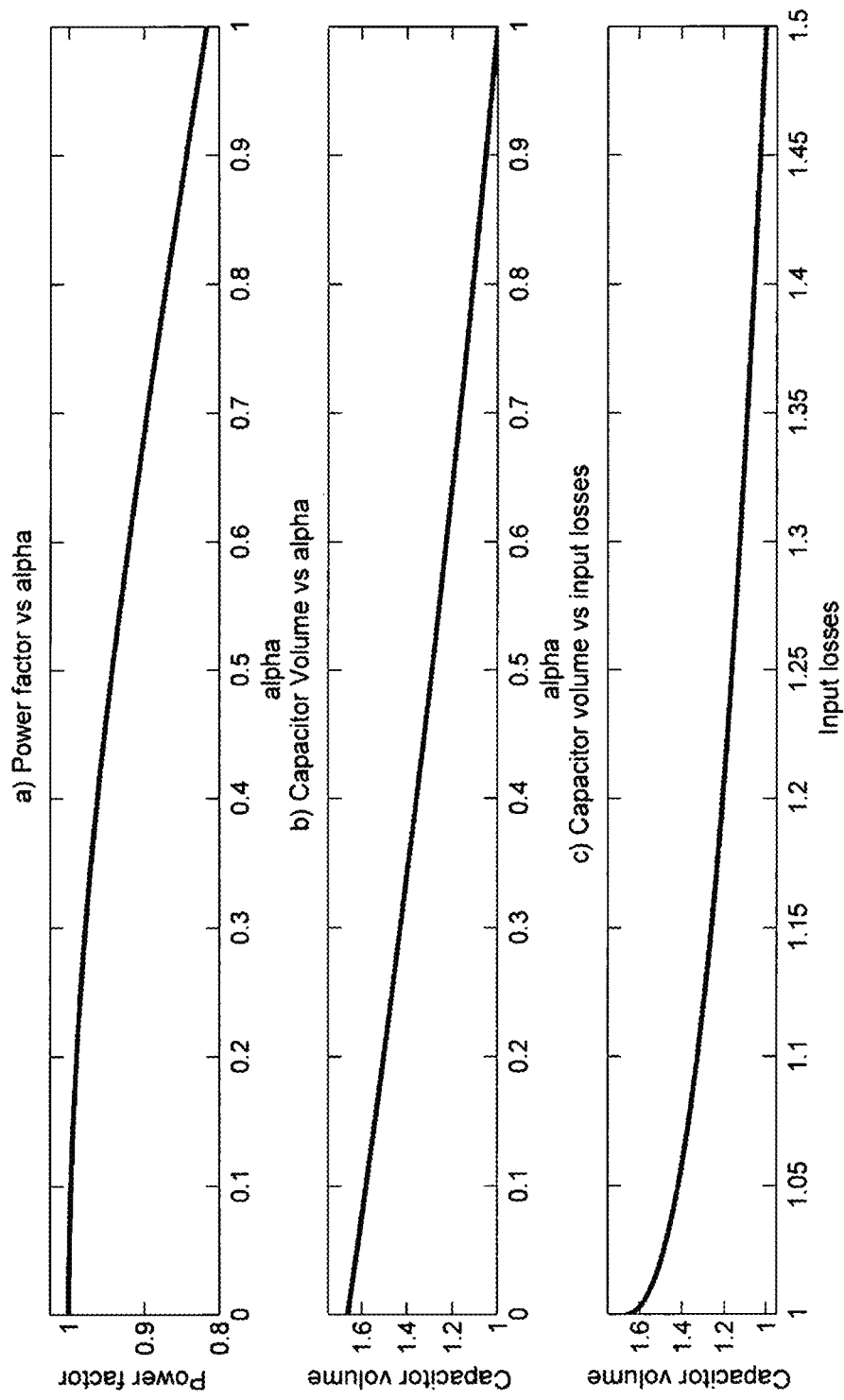
FIG. 8 are three plots of a simulation of a case for an output AC of 5 kW @10 Hzz, 500 uF bus capacitance and 800 Vdc.

In order to put numbers to the trade-off that this alpha term allows, FIG. 8 presents a simulation of a typical AC source with an 800V DC bus and 500 uF capacitance, operating with an output of 5 kW at 10 Hz. The required extra capacitor volume is used as a measure of the impact of the DC bus voltage ripple, and it is assumed that their volume is proportional to their maximum stored energy. The input power losses are used as a measure of the effect of the input power factor. It can be seen that alpha values of 0.3 to 0.4 give a significant improvement in the capacitor bank size (>30%), while keeping the power factor reduction to a small percentage (<5%). It is worth to note that the reduction in the capacitors volume is not the only benefit of minimizing the voltage ripple. Moreover, the plot only shows the reduction caused by an efficient use of the parameter "alpha", and not the total effect of the whole controller presented in this invention.

The 4 pieces of the controller work as a system, and each piece can be optimized to a high degree by taking advantage of the benefits provided by the whole system.

For example, the feedforward term minimizes the voltage ripple at the DC bus and this allows the error to stay within the small error band. Without FF the voltage ripple would be higher, and the non-linear action would be active at the peaks of the ripple (i.e. maximum deviations from the setpoint), thus causing a significant undesired modulation to the input current.

Another example of the interrelation of the control system elements is that the peak voltage control is feasible in a big part by the use of the feedforward term and the non-linear action. Without those two actions it is very likely that once it is activated, the controller will stay in peak control mode for unlimited time. As was commented before, peak voltage control in PFCs is only acceptable for very short periods of time and not at steady state because of the dramatic effects in the input distortion and power factor. With all 4 pieces of the preferred embodiment working together, the peak protection is active only for a short time after extreme perturbations (e.g. input power brown-out). Once the peak control action is disabled, the main loop has to quickly take over voltage regulation to avoid further peak limit actions, and this is possible with the non-linear term and the output power feedforward schemes.

While embodiments have been described in detail, it should be appreciated that various modifications and/or variations may be made without departing from the scope or spirit of the invention. In this regard it is important to note that practicing the invention is not limited to the applications described herein. Many other applications and/or alterations may be utilized provided that such other applications and/or alterations do not depart from the intended purpose of the invention. Also, features illustrated or described as part of one embodiment may be used in another embodiment to provide yet another embodiment such that the features are not limited to the embodiments described herein. Thus, it is intended that the invention cover all such embodiments and variations. Nothing in this disclosure is intended to limit the scope of the invention in any way.

What is claimed is:

1. A voltage controller for use with a power factor correction converter, and the power factor correction converter connected to a DC to AC converter, the voltage controller comprising:
   a digital controller comprising a voltage setpoint, a linear PI compensator, a non-linear gain, a peak hysteretic control, a current loop, and an output power feedforward;
   power stages for providing voltage out feedback, voltage in feedback, inductor current feedback, and current out feedback;
   the linear PI compensator regulating voltage based upon a moving average filter (MAF) that receives the voltage out feedback from the power stages with the MAF being tuned in real time based on the output frequency of aDC to AC converter;
   the non-linear gain for determining a non-linear action when the voltage out feedback deviates from a setpoint by more than a pre-programmed limit and the non-linear action being utilized by the PI compensator to further accelerate voltage regulation;
   the peak hysteretic control detects the voltage out feedback of a DC bus and directs the power factor correction voltage controller output to zero if the DC bus voltage exceeds a maximum value, when the voltage deviation exceeds a pre-programmed limit, and the hysteretic peak control directs the power factor correction voltage controller output to a maximum when the DC bus voltage reaches a minimum value, when the voltage deviation exceeds a pre-programmed limit;
   the output power feedforward (FF) utilizing a MAF tuned in real time based on the output frequency of the DC to AC converter, and the applied FF term is the sum of a percentage of the output power FF term with the MAF plus a percentage of the FF term without the MAF, and the sum of both percentages equals 100%, and the ratio of the MAF versus the non-MAF components is defined by a coefficient that allows optimization of the power factor correction voltage controller; and
   the output of the MAF, the setpoint, and the non-linear action, comprising the input to the linear PI compensator, and the output of the linear PI compensator and the output of the FF comprising the input to the peak hysteretic control, and the voltage out feedback is input to the peak hysteretic control and is utilized by the peak hysteretic control to prevent the digital controller from exceeding maximum limits, and the output from the peak hysteretic control comprising the input to a current loop, and an inductor current feedback from the power stages is utilized by the current loop, and the current loop comprising the input to the power stages, thereby forming a closed loop.

2. A power factor correction method comprising the steps of:
   regulating the voltage of a closed loop system utilizing a linear PI compensator that regulates voltage based upon a moving average filter (MAF) that receives a voltage feedback from power stages with the MAF being tuned in real time based on the output frequency of the unit;
   compensating for voltage deviations higher than a certain level based upon feedback from power stages and from a setpoint by more than a preprogrammed limit for a non-linear action to provide an input to the linear PI compensator;
   directing a digital controller output to zero through a hysteretic peak control if the DC bus voltage exceeds a maximum value, when the voltage deviation exceeds a pre-programmed limit, and the hysteretic peak control directs the digital controller output to a maximum when the DC bus voltage reaches a minimum value, when the voltage deviation exceeds a pre-programmed limit using a peak hysteretic control, and the peak hysteretic control operating between a linear PI compensator and a current loop;
   determining an output power feedforward (FF) signal using a measured output power feedback for the power stages to anticipate a required input power to the front end where the output power is calculated in real time based on a DC bus voltage and an output current, and the FF signal being directed to the output of the PI compensator; and
   directing the input to the power stages through a current loop that receive signals from the peak hysteretic control and inductor current feedback received from the power stages.

3. A power factor correction voltage method, the method comprising the steps of:
   a. applying a moving average filter (MAF) that utilizes a voltage feedback signal in a loop for providing an input to a linear PI compensator, and the MAF being tuned in real time based on the output frequency of an AC source;
   b. directing the power factor correction voltage controller output to zero if the DC bus exceeds a maximum value, when a voltage deviation exceeds a pre-programmed limit;
   c. directing the power factor correction voltage controller output to a maximum when the DC bus reaches a minimum value, when a voltage deviation exceeds a pre-programmed limit; and
   d. applying an output power feedforward (FF) process utilizing a MAF tuned in real time based on the output frequency of the AC source to minimizes the voltage ripple at the DC bus.

4. A voltage controller for use with a power factor correction converter, and the power factor correction converter connected to a DC to DC converter, the voltage controller comprising:
   a digital controller comprising a voltage setpoint, a linear PI compensator, a non-linear gain, a peak hysteretic control, a current loop, and an output power feedforward;
   power stages for providing voltage out feedback, voltage in feedback, inductor current feedback, and current out feedback;
   the non-linear gain for determining a non-linear action when the voltage out feedback deviates from a setpoint by more than a pre-programmed limit and the non-linear action being utilized by the PI compensator to further accelerate voltage regulation;
   the peak hysteretic control detects the voltage out feedback of aDC bus and directs the power factor correction voltage controller output to zero if the DC bus voltage exceeds a maximum value, when the voltage deviation exceeds a pre-programmed limit, and the hysteretic peak control directs the power factor correction voltage controller output to a maximum when the DC bus voltage reaches a minimum value, when the voltage deviation exceeds a pre-programmed limit;

the output power feedforward (FF) term calculated based on the output voltage and current measurements, and the input voltage measurement; and the setpoint, and the non-linear action, comprising the input to the linear PI compensator, and the output of the linear PI compensator and the output of the FF comprising the input to the peak hysteretic control, and the voltage out feedback is input to the peak hysteretic control and is utilized by the peak hysteretic control to prevent the digital controller from exceeding maximum limits, and the output from the peak hysteretic control comprising the input to a current loop, and an inductor current feedback from the power stages is utilized by the current loop, and the current loop comprising the input to the power stages, thereby forming a closed loop.

\* \* \* \* \*